United States Patent
Low et al.

(10) Patent No.: US 7,860,063 B2
(45) Date of Patent: Dec. 28, 2010

(54) SYSTEMS AND METHODS FOR WIRELESS ACCESS TERMINAL COMMAND PROCESSING

(75) Inventors: Su-Lin Low, San Diego, CA (US); Jing Su, San Diego, CA (US); Gene W. Marsh, Encinitas, CA (US)

(73) Assignee: VIA Telecom Co., Ltd., George Town (KY)

( * ) Notice: Subject to any disclaimer, the term of this patent is extended or adjusted under 35 U.S.C. 154(b) by 762 days.

(21) Appl. No.: 11/832,686

(22) Filed: Aug. 2, 2007

(65) Prior Publication Data

US 2008/0056214 A1    Mar. 6, 2008

Related U.S. Application Data

(60) Provisional application No. 60/824,216, filed on Aug. 31, 2006.

(51) Int. Cl.
*H04W 4/00* (2009.01)
*H04L 12/42* (2006.01)
*H04L 12/403* (2006.01)
*H04J 3/16* (2006.01)
*H04J 3/22* (2006.01)

(52) U.S. Cl. .................. 370/331; 370/338; 370/453; 370/457; 370/466; 370/467

(58) Field of Classification Search .......... 370/328, 370/331, 338, 453, 457, 466, 467
See application file for complete search history.

(56) References Cited

U.S. PATENT DOCUMENTS

| | | | | |
|---|---|---|---|---|
| 5,978,366 A | * | 11/1999 | Massingill et al. | 370/337 |
| 6,999,765 B2 | * | 2/2006 | Hokao | 455/436 |
| 7,684,373 B2 | * | 3/2010 | Ekvetchavit et al. | 370/335 |
| 2002/0001291 A1 | * | 1/2002 | Willars et al. | 370/329 |
| 2005/0049000 A1 | * | 3/2005 | Sheynman et al. | 455/552.1 |
| 2005/0251097 A1 | * | 11/2005 | Mernoe | 604/221 |
| 2007/0140207 A1 | * | 6/2007 | Narushima | 370/345 |

FOREIGN PATENT DOCUMENTS

WO    WO2005034389    4/2005

* cited by examiner

*Primary Examiner*—Chi H Pham
*Assistant Examiner*—Farah Faroul
(74) *Attorney, Agent, or Firm*—Baker & McKenzie LLP (57) ABSTRACT

A wireless access terminal is configured to enter into a freeze state where the wireless access terminal temporarily stops decoding and receiving data for a first access network, when the wireless access terminal's modem tunes away from the first access network to monitor signals from a second access network. When the modem tunes back, the wireless access terminal continues processing signals from the first access network without re-initializing with the first access network. When the terminal enters the freeze state, state variables for the terminal's various protocols, including layer 1, layer 2, and modem controller protocols can be stored so that the protocols can continue processing when the modem tunes back, without the need to reinitialize.

24 Claims, 7 Drawing Sheets

SYSTEMS AND METHODS FOR WIRELESS ACCESS TERMINAL COMMAND PROCESSING

FIELD OF THE INVENTION

This application claims priority to U.S. Provisional Patent Application Ser. No. 60/824,216, entitled "Access Terminal Modem Freeze Control Handling For Tune Away," filed Aug. 31, 2006, which is incorporated herein by reference in its entirety as if set forth in full.

BACKGROUND OF THE INVENTION

The term "wireless access terminal" as used herein is intended to refer to wireless communication devices used to access a wireless communication system, such as a wireless Wide Area Network (WAN), wireless Metropolitan Area Network (MAN), wireless Local Area Network (LAN), wireless Personal Area Network (PAN), or the like. For example, the term "wireless access terminal" as used herein can be used to refer to a device with cellular telephone type capabilities, e.g., a device that can be used to access a cellular telephone type network. It will be understood that today's wireless access terminal are capable of operating over a variety of network types, using a variety of technologies.

For example, today's cellular telephone is typically capable of operating in a traditional cellular network or a Personal Communication Service (PCS) network. As new capabilities are introduced, the line between different devices, and the network types they operate over, is becoming more blurred so that conventional devices can operate over wireless MANs, WANs, LANs, etc., to communicate voice and/or data information using third and fourth generation technologies. The very idea of a wireless communication device has evolved as wireless communication capabilities have been incorporated into laptop computers, Personal Digital Assistants (PDAs), digital music players, etc. Accordingly, the term "wireless access terminal" as used herein is intended to refer to all such devices.

As mentioned, a wireless access terminal often must be able to communicate using a variety of technologies. When a wireless access terminal initially accesses the network over which it is to operate, it must go through an acquisition and initialization process during which it acquires the network and obtains all of the information necessary to communicate using the network. This process typically involves the wireless access terminal scanning the wireless spectrum to acquire one or more pilot channels that identify network base stations. Once the wireless access terminal has acquired a pilot channel, it can then, e.g., acquire various control channels over which it can obtain information needed to communicate with the base station, paging channels over which it can obtain messages from the base station, and traffic channels over which it can communicate. A wireless access terminal uses various protocols and routines to perform such tasks.

If the wireless access terminal is configured to operate over more than one network using more than one technology, then it must go through this, or a similar process for each network. If the terminal is currently communicating over a first network, then to communicate over a second it must suspend communication with the first network and initialize with the second network. But first, the terminal must determine if the second network is available. In conventional terminals, if the terminal switches to monitor for the presence of a second network, the terminal's protocols, including the layer 2, layer 3, and modem control protocols, enter a freeze state where it temporarily stops decoding and receiving data over the first network. This process is referred to as the "tune away."

During tune away, the terminal protocols associated with the first network are often deactivated. When the modem switches back, i.e., "tunes back," then the terminal must go through the entire initialization process again. This process wastes resources, and since most conventional terminals that work over multiple networks are configured to periodically tune away to check for other networks, the resources are wasted periodically and continuously while the terminal is activated. The cumulative effect is increased power consumption and inefficiencies, which lead to reduced performance and reduced battery lifetimes. Battery lifetime, always important, is becoming even more important because today's terminals have increased functionality. Increased functionality means increased power consumption, which reduces battery lifetime. Therefore, the inefficiencies of the conventional tune away-tune back process can have a significant effect.

SUMMARY

A wireless access terminal is configured to enter into a freeze state where the wireless access terminal temporarily stops decoding an and receiving data for a first access network, when the wireless access terminal's modem tunes away from the first access network to monitor signals from a second access network. When the modem tunes back, the wireless access terminal continues processing signals from the first access network without re-initializing with the first access network. When the terminal enters the freeze state, state variables for the terminal's various protocols, including layer 1, layer 2, and modem controller protocols can be stored so that the protocols can continue processing when the modem tunes back, without the need to reinitialize.

In one aspect, a wireless access terminal is configured to monitor signals from at least two different access networks configured to use different technologies for communication. The wireless access terminal comprises a modem configured to transition between the two communication technologies to monitor signals from the access networks and a an initialization state protocol stack configured to enable the wireless access terminal to acquire the access networks. The initialization state protocol comprises an Inactive State, a Network Determination State, a Pilot Acquisition State, a Synchronization State, and at least one state associated with a freeze state process, wherein the protocol is configured to store at least some state information for the current communication technology, when the modem tunes away from a selected one of the access network to monitor for signals from the other access network.

In another aspect, the wireless access terminal comprises an idle state protocol stack configured to enable the wireless access terminal to acquire the access networks. The idle state protocol comprises an Inactive State, a Monitor State, a Sleep State, a Connection Set-up State, and at least one state associated with a freeze state process, wherein the protocol is configured to store at least some state information for the current communication technology, when the modem tunes away from a selected one of the access network to monitor for signals from the other access network.

In still another embodiment, the wireless access terminal comprises a modem controller protocol stack configured to enable the wireless access terminal to control the modem. The modem controller protocol comprises an Inactive State, an Initial Acquisition State, a Mini Acquisition State, an Active State, and at least one state associated with a freeze state process, wherein the protocol is configured to store at least some state information for the current communication technology, when the modem tunes away from a selected one of the access network to monitor for signals from the other access network.

These and other features, aspects, and embodiments of the invention are described below in the section entitled "Detailed Description."

BRIEF DESCRIPTION OF THE DRAWINGS

Features, aspects, and embodiments of the inventions are described in conjunction with the attached drawings, in which.

DETAILED DESCRIPTION

Systems and methods for freeze state operation during tune away-tune back procedures are described below. In general, the systems and methods described below are presented in the context of a Code Division Multiple Access (CDMA) system. It will be understood, however, that the systems and methods described below are not necessarily limited to CDMA systems. Therefore, the examples presented below should not be seen as limiting the systems and methods described herein to any particular system or the use of any particular communication protocol.

Figure 1:
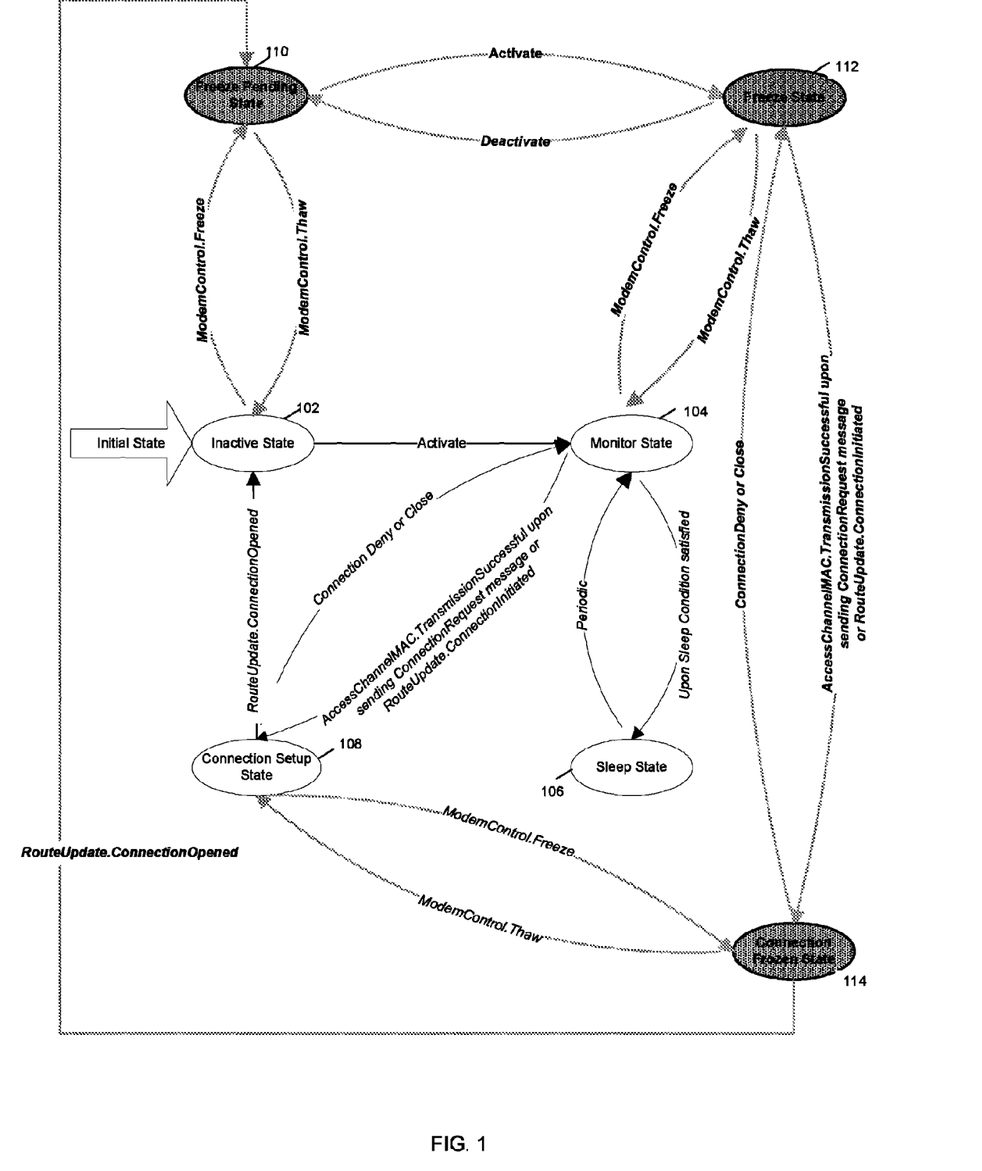
FIG. 1 is a state diagram illustrating an example idle state protocol that incorporates a freeze state process in accordance with one embodiment.
Figure 2:
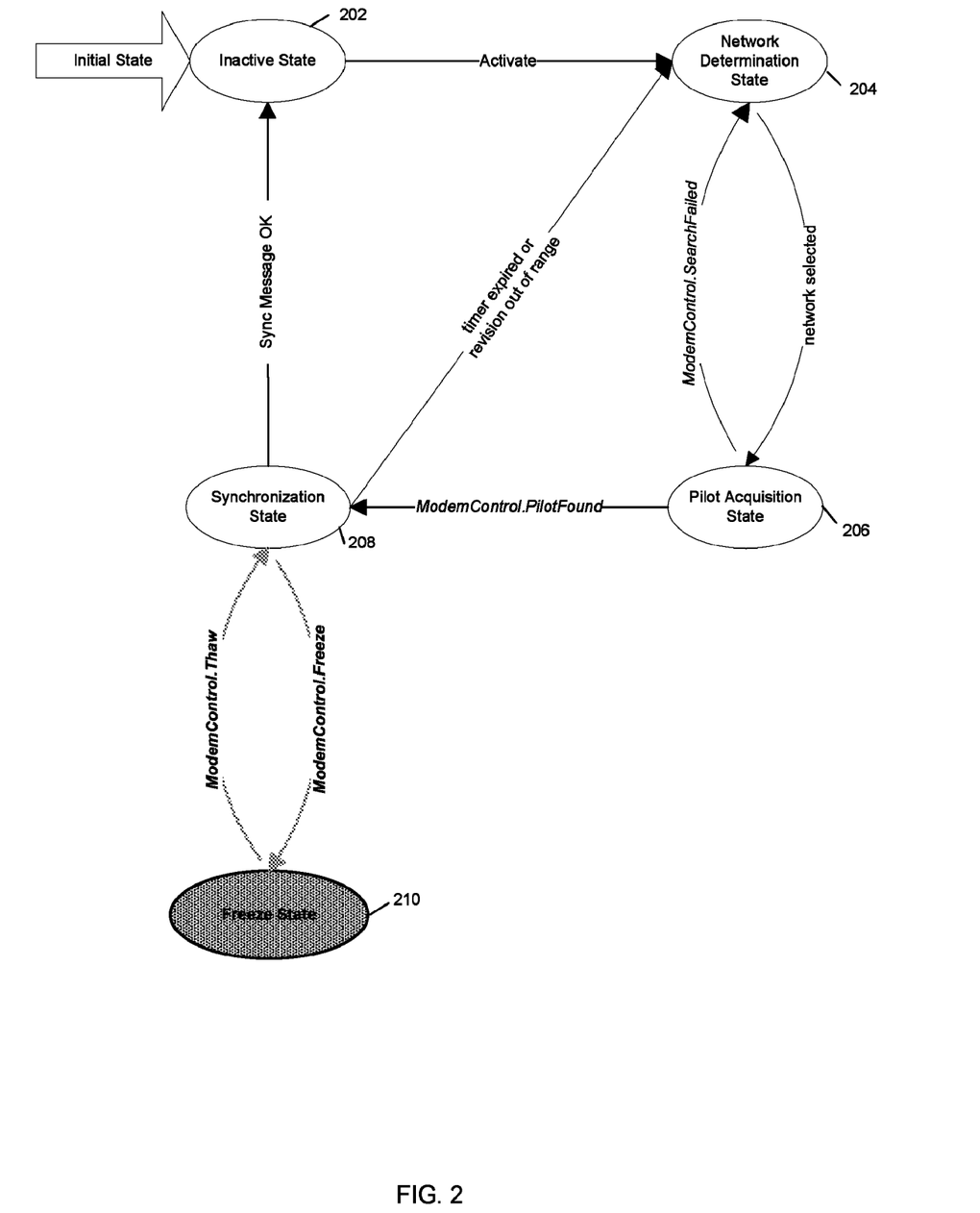
FIG. 2 is a state diagram illustrating an example initialization state protocol that incorporates a freeze state process in accordance with one embodiment.
Figure 3:
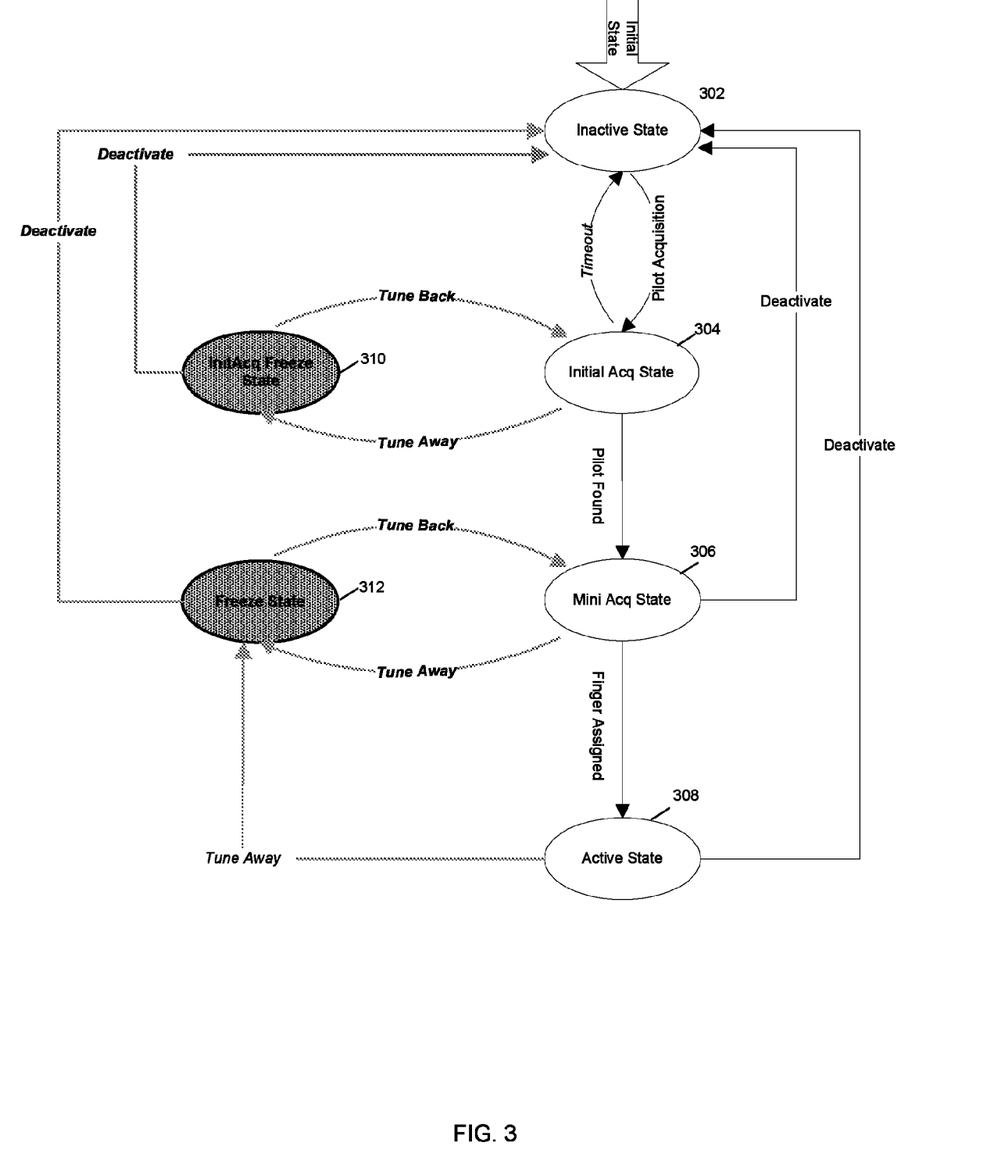
FIG. 3 is a state diagram illustrating an example of modem controller protocol that incorporates a freeze state process in accordance with one embodiment.
Figure 5:
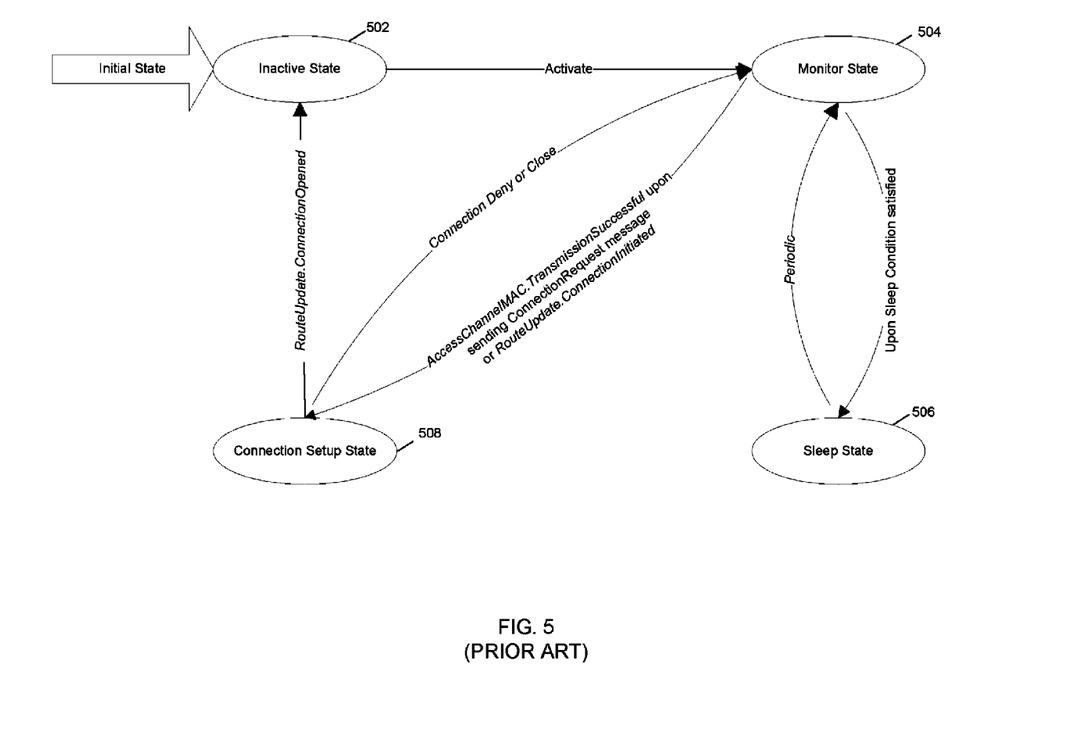
FIG. 5 is a state diagram illustrating an exemplary idle state protocol.
Figure 6:
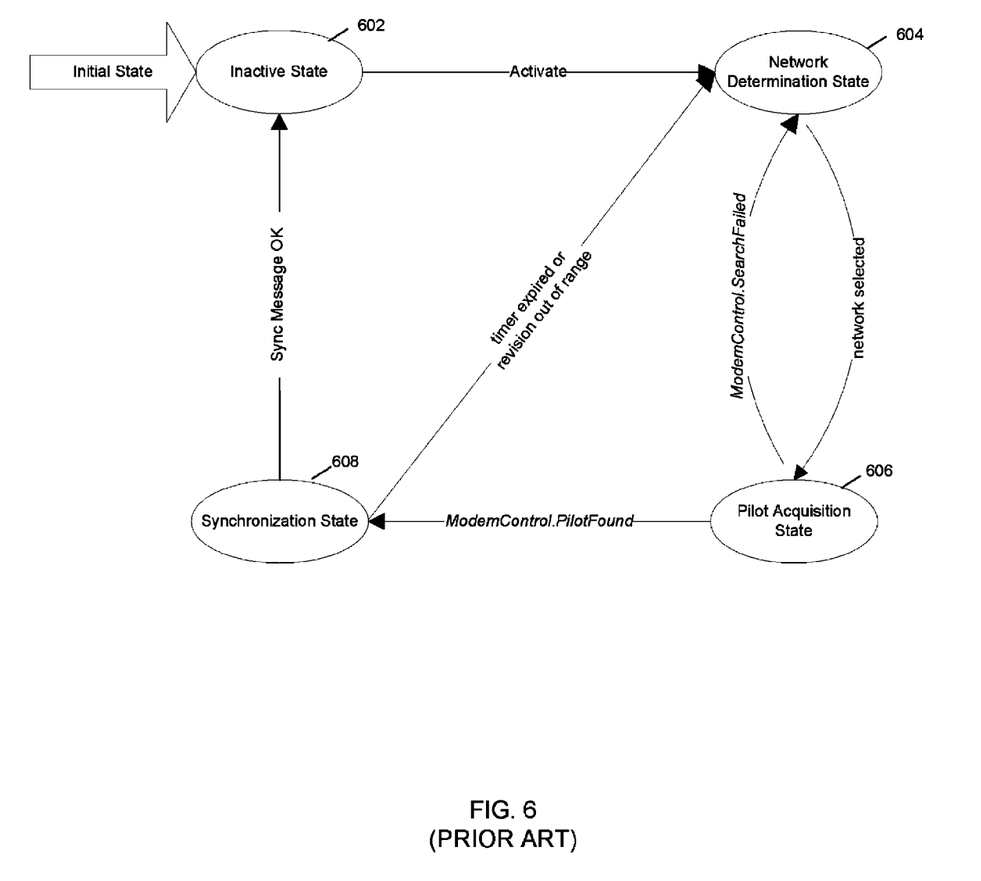
FIG. 6 is a state diagram illustrating an exemplary initialization state protocol.
Figure 7:
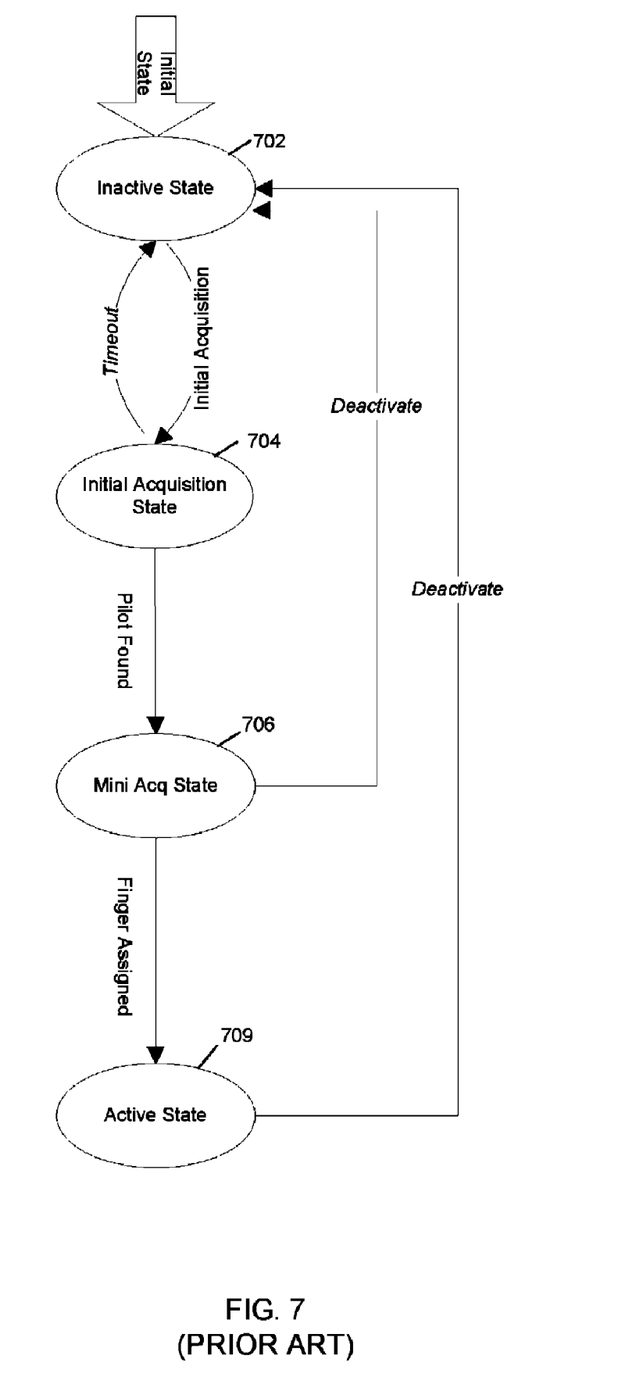
FIG. 7 is a state diagram illustrating an exemplary modem controller protocol.

FIGS. 1-3 are state diagrams respective illustrating idle state, initialization state, and modem controller protocols that incorporate a freeze state operation in accordance with the systems and methods described herein. First, however, FIGS. 5-7 are state diagrams illustrating the corresponding conventional processes. The state diagrams of FIGS. 5-7 are described first in order to point out the differences between conventional protocols and the protocols described herein.

Accordingly, FIG. 5 is a state diagram for a conventional idle state protocol. Idle state protocols, e.g., the default idle state protocol and the enhanced idle state protocol, are connection layer protocols of the, e.g., 1×HRPD (High Rate Packet Data) system that provides sleep/monitor control for a wireless access terminal after it has acquired the network, but before it has an open connection. Specifically, conventional idle state protocols involve procedures to keep track of the wireless access terminals approximate location for efficient paging, and to support power conservation for the wireless access terminal. As can be seen in the state diagram of FIG. 5, conventional idle state protocols operate in one of four states; the Inactive State 502, the Monitor State 504, the Sleep State 506, and the Connection Setup State 508.

When in the Inactive State 502, the wireless access terminal waits for an activate command. When the activate command is received, the protocol moves to Monitor State 504. In Monitor State 504, the wireless access terminal monitors the control channel and listens for page message from the base station. If necessary, the wireless access terminal will update parameters stored within the terminal with information received from the paged messages. Depending on the implementation, the base station may transmit unicast packets to the wireless access terminal in state 504.

After a certain period of time, if the wireless access terminal has not received any page messages from the base station, then it can transition into a Sleep State 506. In Sleep State 506, the wireless access terminal can be configured to shutdown part of its subsystems to conserve power. While in Sleep State 506, the wireless access terminal typically does not monitor the forward channel, and the base station, or access network, is not allowed to transmit unicast packets to the wireless access terminal. Periodically, the wireless access terminal will be configured to transition from Sleep State 506 back to Monitor State 504 in order to check for any paged messages from the base station. Again, while in Monitor State 504, the wireless access terminal will monitor the control channel, listen for page messages, and if necessary update any parameters received from the overhead messages protocol.

While in Monitor State 504, the wireless access terminal may need to access the network and establish a connection. If a wireless access terminal is to establish a connection, then the protocol will transition from Monitor State 504 to Connection Setup State 508 and the wireless access terminal will attempt to establish the connection via communication with the base station. If the connection is denied, or is closed, then the protocol will transition back to the Monitor State 504.

FIG. 6 is a state diagram illustrating a conventional initialization state protocol. The initialization state protocol also comprises four states: Inactive State 602, Network Determination State 604, Pilot Acquisition State 606, and Synchronization State 608. In Inactive State 602, the wireless access terminal waits for an activate command. Once the activate command is received, the protocol transitions to Network Determination State 604. In Network Determination State 604, the wireless access terminal chooses an access network on which to operate. Once an access network is selected, then the protocol transitions to Pilot Acquisition State 606, in which the wireless access terminal attempts to acquire a forward pilot channel from a base station operating within the selected access network. If the attempt to acquire a forward pilot channel fails, then the protocol returns to Network Determination State 604. If the forward pilot channel is found, then the protocol transitions to Synchronization State 608.

In Synchronization State 608, the wireless access terminal synchronizes to the control channel cycle for the selected access network. Once synchronized, then the wireless access terminal can receive sync messages, which can allow the wireless access terminal to synchronize with the system time for the selected access network. If time expires, or the wireless access terminal is otherwise unable to synchronize, then the protocol will transition back to the Network Determination State 604. Conversely, if synchronization proceeds as expected, then the protocol can transition back to Inactive State 602.

FIG. 7 is a state diagram illustrating a conventional modem controller protocol. Again, the modem controller protocol of FIG. 7 comprises four states: an Inactive State 702, Initial Acquisition State 704, Mini-Acquisition State 706 and Active State 708. The modem controller protocol is responsible for controlling the modem hardware, which is described in more detail below, including the searcher and fingers, and RF antenna resources. It will be understood, that the terms "searcher" and "finger" refer to resources that are unique, at least in some respects, to a CDMA system; however, other resources can be controlled by the modem controller protocol as required by other technologies.

While in Inactive State 702, the wireless access terminal waits for a pilot acquisition command. Once the pilot acquisition command is received, then the protocol transitions to Initial Acquisition State 704. While in initial Acquisition State 704, the modem controller will cause the modem to tune to a selected channel and search for a pilot in the defined search space. During this time, the wireless access terminal does not possess correct system timing information. If the search succeeds, then the protocol will transition to Mini-Acquisition State 706. Otherwise, if the wireless access terminal is unable to find a pilot channel within a specified time, then the protocol will transition back to Inactive State 702.

Upon entering Mini-Acquisition State 706, the modem controller begins searching for pilots in the active set on the current channel. During this search, the wireless access terminal will possess some information of the system timing obtained from the pilot found in Initial Acquisition State 704. When a pilot in the active set is found, then the modem controller will assign a finger to this pilot and transition to Active State 708.

In Active State 708, the modem controller actively searches for pilots in the active, candidate, neighbor, and remaining sets. If one or more of these pilots are found, then the modem controller will assign a finger to each. If the modem controller receives a deactivate command in Mini-Acquisition State 706 or Active State 708, then the protocol will transition back to Inactive State 702.

As mentioned above if the modem is forced to tune away in order to monitor a different technology, then the modem protocols are deactivated. Once the modem resources are available, then the wireless access terminal must begin the entire initial acquisition procedure again. For example, if the disruption occurs during call setup, the call setup is aborted, which leads to longer setup times and resources waste. Further, the wireless access terminal may miss pages directed to it during the disruption. During a call, the tune away will cause the call to be released.

FIGS. 1-3 are state diagrams illustrating idle state, initialization state, and modem controller protocols that incorporate a freeze state operation that enables the wireless access terminal to preserve certain state information so that the terminal can return to a certain protocol upon tune back. For example, FIG. 1 is a state diagram illustrating an example idle state protocol, e.g., a default idle state protocol or an enhanced idle state protocol, in accordance with one embodiment. As can be seen in FIG. 1, the idle state protocol comprises the four states that comprised a more conventional idle state protocol. Namely, the idle state protocol of FIG. 1 includes an Inactive State 102, Monitor State 104, Sleep State 106, and Connection Set-up State 108. In addition, however, the idle state protocol of FIG. 1 also includes three additional states that are associated with a freeze state process that allows the wireless access terminal to conserve resources during tune away and tune back. These additional states are the Freeze Pending State 110, Freeze State 112, and Connection Frozen State 114.

For example, if a tune away occurs while the protocol is in Monitor State 104, then the protocol can transition to Freeze State 112, where it temporarily stops monitoring overhead messages in a control channel. Once tune back occurs, the protocol can resume operation in Monitor State 104, without going through the entire initial acquisition process. In this manner, terminal resources can be conserved. If tune away occurs in connection Setup State 108, the protocol can enter a Connection Frozen State 114 where the setup procedure that was occurring in Connection Setup State 108 can be put on hold until tune back occurs. Moreover, the call setup will not be aborted. Thus, when tune back occurs and the protocol transitions from Connection Frozen State 114 back to Connection Setup State 108, significant time and resources can be conserved because the call setup procedure can resume from where it was put on hold at the initiation of the tune away procedure. If a tune away occurs while the traffic channel is active, the protocol can be configured to enter the Freeze Pending State 110 until tune back occurs at which point the process can transition back to state 102. Moreover, the call, or traffic channel, will not be released during tune away.

Two additional commands for use in the software programs used to control the operation of the wireless access terminal can be introduced in order to control the transition between the various freeze states, i.e., Freeze Pending State 110, Freeze State 112, and Connection Frozen State 114, and the conventional idle state protocol states, i.e., Inactive State 102, Monitor State 104, Sleep State 106, and Connection Setup State 108. These new commands can be the ModemControl.Freeze command and the ModemControl.Thaw command. In one example, the ModemControl.Freeze command is generated by the terminal and is received by the protocol of FIG. 1 if the RF (radio frequency) and/or any other resources for the current technology are unavailable, i.e., the wireless access terminals modem control switches to monitor different technology (tune away). The ModemControl.Thaw command is received by the protocol of FIG. 1 if the RF and/or any other resources for the current technology become available, i.e., the wireless access terminals modem control is switched back (tune back). Thus, if the protocol is in Monitor State 104 and receives a ModemControl.Freeze command, then the protocol will transition to Freeze State 112. While in Freeze State 112, if the protocol receives a ModemControl.Thaw command, then the protocol will transition from Freeze State 112 to Monitor State 104. Similarly, if the protocol is in Connection Setup State 108 and receives a ModemControl.Freeze command then the protocol will transition the connection Frozen State 114. If the protocol receives a ModemControl.Thaw command while in the Connection Frozen State 114, then the protocol will transition back to Connection Setup State 108. If a ModemControl.Freeze is received while in Inactive State 102, then the protocol will transition to Freeze Pending State 110. If the ModemControl.Thaw command is received while in Freeze Pending State 110, then the protocol will transition back to Inactive State 102.

Further, if the protocol receives an activate command while in Freeze Pending State 110, then the protocol will transition to Freeze State 112. If the protocol receives a deactivate command while in Freeze State 112, then the protocol shall transition back to Freeze Pending State 110. If a deactivate command is received in Freeze Pending State 110, it can be ignored. If the protocol receives an open connection command in Freeze State 112, then it shall send a connection request message and transition to Connection Frozen State 114. If a connection denied or closed command is received while in Connection Frozen State 114, then the protocol will transition back to Freeze State 112. If an open connection command is received in Freeze Pending State 110 or Connection Frozen State 114, then the command can be ignored. If a close command is received in Freeze Pending State 110 or Freeze State 112, then it can also be ignored. If a RouteUpdate.ConnectionOpen indication is received in Connection Frozen State 114, then the protocol shall return a connection opened indication and transition to Freeze Pending State 110.

Deactivate commands are issued when the terminal enters Sleep State 106. Further, when the access terminal is in the freeze state, it shall stop monitoring the control channel by issuing certain commands. For example, in one embodiment, the access terminal can issue an OverheadMessage.Deactivate command and a ControlChannelMAC.Deactivate command.

If the wireless access terminal receives an OverheadMessage.Update command indication while in Freeze State 112, then the terminal shall queue the command for action once the protocol returns to Monitor State 104. Further, if the access terminal receives a page message, then the terminal shall send a connection request message and, as mentioned above, if the access terminal receives a RouteUpdate.ConnectionInitiated indication it shall transition to the connection Frozen State 114.

FIG. 2 is a state diagram illustrating an example initialization state protocol in accordance with one embodiment. As can be seen, the protocol FIG. 2 includes the conventional Inactive State 202, Network Determination State 204, Pilot Acquisition State 206, and Synchronization State 208. In addition, the protocol FIG. 2 includes Freeze State 210. If tune away occurs while the protocol is in Synchronization State 208, then the protocol will transition to Freeze State 210. While in Freeze State 210, the wireless access terminal's modem will be configured to temporarily stop monitoring overhead messages in the control channel. Once tune back occurs, i.e., the wireless access terminal's modem switches back to the original technology, then the wireless access terminal will resume operation in Synchronization State 208 without going through the entire initial acquisition process.

Thus, if a ModemControl.Freeze command is received while in Synchronization State 208, then the protocol FIG. 2 will transition to Freeze State 210. If a ModemControl.Thaw command is received in Freeze State 210, then the protocol will transition back to Synchronization State 208. While in Freeze State 210, the wireless access terminal can be configured to stop all timers and issue a ControlChannelMAC.Deactivate command. A ControlChannelMAC.Deactivate command will cause the wireless access terminal's modem to stop monitoring overhead messages on the control channel.

FIG. 3 is a state diagram illustrating an example of modem controller protocol in accordance with one embodiment. Again, the protocol FIG. 3 comprises the conventional Inactive State 302, initial Acquisition State 304, mini Acquisition State 306, and Active State 308. In addition, the protocol FIG. 3 includes initial acquisition Freeze State 310 and Freeze State 312. Initial acquisition Freeze State 310 and Freeze State 312 are introduced in order to handle the loss of RF resources due to the monitoring of a different technology (tune away).

Specifically, when the RF and/or any other resources are preempted by another technology, the modem controller protocol can be configured to transition to either state 310 or state 312, where all modem state variables are saved and modem processing is suspended. If the RF resources preemption occurs during the Mini Acquisition State 306 or Active State 304, then a ModemController.Freeze command can be issued which is sent out to all other stack protocols, including the idle state protocol and the initial state protocol and the initialization state protocol, as described in FIGS. 1 and 2, to inform these protocols to transition to their Freeze States as well.

Once the RF and/or any other resources are available again (tuned back), the modem controller protocol can restore all the modem variables, and transition out of Freeze States 310 or 312 and continue with the modem processing where it left off. This can also cause a ModemController.Thaw command to be issued to the other stack protocols, i.e., the idle state protocol and the initialization state protocol, to inform these protocols to transition out of their Freeze States.

Thus, if modem controller protocol is in Initial Acquisition State 304, then the protocol will transition to Initial Acquisition Freeze State 310 upon the occurrence of a tune away. At this point, all initial search variables, e.g., CDMA channels and frequency variables, are saved and all searches are temporarily suspended. The RF and/or any other resources used by the current technology are deactivated and freed up for monitoring of a second technology. When tune back occurs, the search variables can be restored, the modem controller protocol can transition back to the Initial Acquisition State 304, all RF resources used by the original technology can be activated, and initial acquisition searching in state 304 can continue.

If tune away occurs during Mini Acquisition State 306, or Active State 308, then the protocol can transition to Freeze State 312 and all modem state variables can be saved, e.g., including CDMA channels and frequency variables as well as active, candidate, neighbor, and remaining set pilot information. All searches are temporarily suspended and all RF and/or any other resources used by the original technology are deactivated and freed. A ModemController.Freeze indication is then sent out to the other stack protocols, i.e., the idle state protocols and initialization state protocols.

When tune back occurs, the modem state variables can be restored, the modem controller protocol can transition back to the Mini Acquisition State 306 or Active State 308, all RF resources used by the original technology can be activated, and online searches and figure assignments can continue. The ModemController.Thaw indication can also be sent out to the other stack protocols.

Accordingly, by using the processes described in relation to FIGS. 1-3, the wireless access terminal does not have to go through the entire process of initial acquisition, in the event the wireless access terminal tunes away temporarily to monitor a different technology for a short period of time. Further, the radio resources are conserved and call setup times can be reduced, since the call setup procedures are not disrupted by tune away. During a call in the access terminal traffic channel state, the call will not be released when the tune away occurs. The number of missed pages directed to the wireless access terminal is also minimized.

Figure 4:
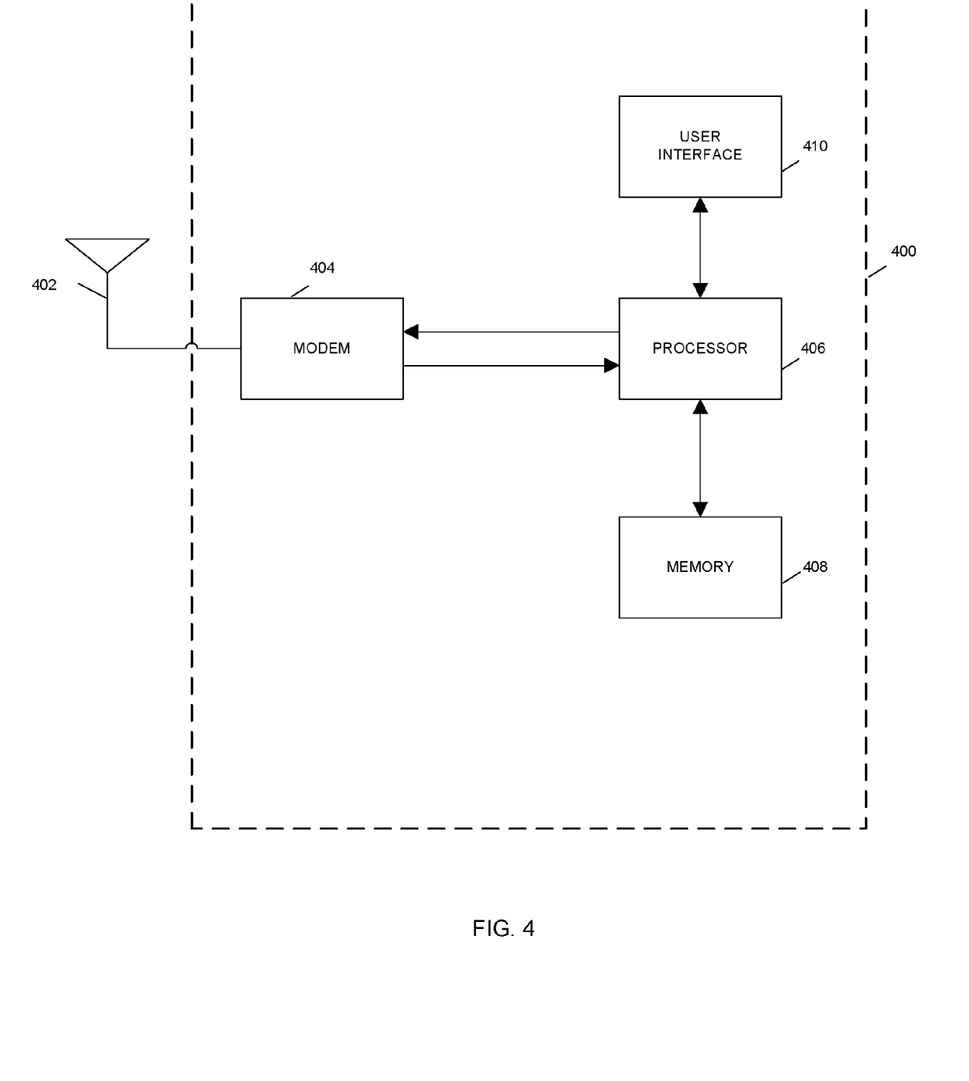
FIG. 4 is a block diagram illustrating certain components of a example wireless access terminal configured to implement the protocols of FIGS. 1-3.

FIG. 4 is a block diagram illustrating certain components of a wireless access terminal 400 in accordance with one embodiment. It will be understood, that there are many components of a wireless access terminal that are not illustrated in FIG. 4, and that the components illustrated are not intended to be all encompassing. Rather, the components illustrated in FIG. 4 are illustrated for the purpose of describing relevant operations within a wireless access terminal 400.

Wireless access terminal 400 comprises an antenna 402 configured to transmit and receive wireless signals. Antenna 402 is coupled with modem 404, which is configured to receive wireless signals from antenna 402 and convert them into base band signals for processing by processor 406. Modem 404 is also configured to receive base band signals from processor 406, and convert them into signals that can be transmitted via antenna 402. Thus, modem 404 can comprise the demodulators, filters, amplifiers, and analog to digital converters, needed to convert the wireless signals received by antenna 402 into a base band signal that can be processed by processor 406. Modem 404 can also comprise the digital to analog converters, filters, modulators, and amplifiers, needed to take a base band signal from processor 406 and convert it into a signal that can be transmitted via antenna 402. It will be understood, that some of the components just described in relation to modem 404, can be included in processor 406, and that the description above is not intended to limit wireless access terminal 400 to any particular configuration or architecture.

The components included in a modem 404, can be configured, and/or additional components can be included, to allow modem 404 to send and receive signals using multiple technologies. Thus, modem 404 can be configured to monitor wireless signals associated with a first technology, and to tune away in order to monitor signals associated with the second technology. Modem 404 can be configured such that it can then tune back to the original technology when required.

Processor 406 can be configured to process signals received from modem 404 and generate signals to be transmitted by modem 404. In addition, processor 406 can be configured to control the operation of wireless access terminal 404. For example, processor 406 can be configured to execute instructions stored in memory 408 that allow processor 406 to control the operation of wireless access terminal 400. Thus, processor 406 can be configured to implement the protocols described in relation to FIGS. 1-3 by executing the appropriate instructions stored in memory 408.

It will be understood, that processor 406 can comprise one or more processing circuits, such as a digital signal processor, a microcontroller or microprocessor, a math co-processor, etc. Moreover, processor 406 can comprise one or more integrated circuits depending on the embodiment. Similarly, memory 408, which can also be configured to store variables associated with the operation of wireless access terminal 400, can comprise one or more memory devices such as permanent memory, as well as temporary memory. Memory 408 can comprise one or more integrated circuits, such as one or more EEPROMs, one or more SRAMs, one or more flash memory devices, as well as one or more removable storage mediums.

Wireless access terminal 400 also includes user interface 410, which comprises the mechanisms by which information is communicated to or from a user of wireless access terminal 400. For example, user interface 410 can comprise a display, one or more LEDs or light indicators, a keypad, a shuttle dial, a buzzer, a speaker, a microphone, etc.

While certain embodiments of the inventions have been described above, it will be understood that the embodiments described are by way of example only. Accordingly, the inventions should not be limited based on the described embodiments. Rather, the scope of the inventions described herein should only be limited in light of the claims that follow when taken in conjunction with the above description and accompanying drawings.

What is claimed is:

1. A wireless access terminal configured to monitor signals from at least two different access networks configured to use different communication technologies, the wireless access terminal comprising:
   a modem configured to transition between the different communication technologies to monitor signals from the at least two different access networks; and
   a protocol module configured to process commands associated with a first communication technology associated with a selected one of the at least two different access networks, the protocol module further configured to enter a specific state in response to the modem tuning away from the selected access network to monitor a second access network using a second communication technology and to resume processing commands associated with the first communication technology, without the need to reinitialize, in response to the modem tuning back to the selected access network, wherein the protocol module executes:
   an idle state protocol to provide sleep/monitor state control for the wireless access terminal after it has acquired one of the at least two different access networks, before it has established a connection with the acquired access network,
   an initialization state protocol to enable the wireless access terminal to acquire the one of the at least two different access networks, and
   a modem controller protocol to enable the wireless access terminal to control the modem;
   wherein one of the idle state protocol, initialization state protocol, or modem controller protocol is configured to store at least some state information for the first communication technology, when the protocol module tunes away from the acquired access network to monitor for signals from another of the at least different two access networks.

2. The wireless communication device of claim 1, wherein the idle state protocol comprises:
   an Inactive State;
   a Freeze Pending State; and
   a Monitor State;
   wherein the wireless access terminal is configured to wait for an activate command when the idle state protocol is in the Inactive State,
   wherein the idle state protocol is configured to transition from the Inactive State to the Monitor State when the activate command is received,
   wherein the idle protocol is configured to transition from the Inactive State to the Freeze Pending State when the modem tunes away while a traffic channel established between the wireless access terminal and the access network is active, and
   wherein the idle state protocol is configured to transition from the Freeze Pending State to the Inactive State when the modem tunes back to the acquired access network.

3. The wireless access terminal of claim 2, wherein the idle state protocol comprises a Monitor Sate and a Freeze State, wherein the idle state protocol is configured to transition from the Monitor State to the Sleep State when sleep state conditions are satisfied,
   wherein the idle protocol is configured to transition from the Sleep State to the Monitor State periodically in order to monitor the control channel and the page channel,
   wherein the idle state protocol is configured to transition from the Monitor State to the Freeze State if the modem tunes away while the idle state protocol is in the Monitor State, and
   wherein the wireless access terminal is configured to stop monitoring the control channel and paging channel while the idle state protocol is in the Freeze State.

4. The wireless access terminal of claim 3, wherein the idle state protocol comprises a Connection Setup State and a Connection Frozen State, wherein the idle state protocol is configured to transition from the Monitor State to the Connection Setup State when the wireless access terminal attempts to set up a connection,
   wherein the idle protocol is configured to transition from the Connection Setup State to the Connection Frozen State when the modem tunes away while the idle state protocol is attempting to set up a connection in the Connection Setup State, wherein the idle state protocol is configured to transition from the Connection Frozen State to the Connection Setup State and continue the connection set up process when the modem tunes back to the acquired access network, and wherein the connection set up is not aborted while the idle state protocol is in the Connection Frozen State.

5. The wireless access terminal of claim 4, wherein the idle state protocol is configured to transition back to the Monitor State if the connection set up fails.

6. The wireless access terminal of claim 4, wherein the idle state protocol is configured to transition from the Connection Frozen State to the Connection Setup State and continue the connection set up process when the modem tunes back to the acquired access network.

7. The wireless access terminal of claim 4, wherein the idle state protocol is configured to transition from the Freeze State to the Connection Frozen State when the idle state protocol receives an open connection command while in the Freeze State, and wherein the idle state protocol is configured to transition from the Connection Frozen State to the Freeze State when the idle state protocol receives a connection denied message while in the Connection Frozen State.

8. The wireless access terminal of claim 3, wherein the idle state protocol is configured to transition from the Freeze State to the Monitor State when the modem tunes back to the acquired access network, and resume operation in the Monitor State without going through an initial acquisition process.

9. The wireless access terminal of claim 3, wherein the freeze state process further comprises a Freeze State, and wherein the idle state protocol is configured to transition from the Freeze Pending State to the Freeze State when the idle state protocol receives an activate command while in the Freeze Pending State, and wherein the idle state protocol is configured to transition from the Freeze State to the Freeze Pending State when the idle state protocol receives a deactivate command while in the Freeze State.

10. The wireless access terminal of claim 2, wherein the traffic channel is not released while the idle state protocol is in the Freeze Pending State.

11. The wireless access terminal of claim 1, wherein the initialization state protocol comprises:
an Inactive State;
a Network Determination State, wherein the wireless access terminal is configured to select an access network while the initialization state protocol is in the Network Determination State;
a Pilot Acquisition State, wherein the wireless access terminal is configured to attempt to acquire a pilot channel associated with the selected access network while the initialization state protocol is in the Pilot Acquisition State;
a Synchronization State, wherein the wireless access terminal is configured to synchronize with the selected access network while the initialization state protocol is in the Synchronization State,
wherein the wireless access terminal is configured to wait for an activate command when the initialization state protocol is in the Inactive State, wherein the initialization state protocol is configured to transition from the Inactive State to the Network Determination State when the activate command is received,
wherein the initialization state protocol is configured to transition from the Network Determination State to the Pilot Acquisition State when the selected one of the at least two different access networks is selected.

12. The wireless access terminal of claim 11, wherein the initialization state protocol is configured to transition from the pilot acquisition to the Network Determination State, when the wireless access terminal is unable to acquire the pilot channel, and wherein the initialization state protocol is configured to transition from the Pilot Acquisition State to the Synchronization State when the pilot channel is acquired by the wireless access terminal.

13. The wireless access terminal of claim 11, wherein the initialization state protocol is configured to transition from the Synchronization State to the Network Determination State, when the wireless access terminal is unable to synchronize with the selected access network, and wherein the initialization state protocol is configured to transition from the Synchronization State to the Inactive State, when the wireless access terminal is able to synchronize with the selected access network.

14. The wireless access terminal of claim 11, wherein the freeze state process comprises a Freeze State, and wherein the initialization state protocol is configured to transition from the Synchronization State to the Freeze State, when the modem tunes away from the selected network, wherein the wireless access terminal is configured to temporarily stop monitoring the control channel while the initialization state protocol is in the Freeze State, and wherein the initialization state protocol is configured to transition from the Freeze State to the Synchronization State when the modem tunes back to the selected network, and wherein the wireless access terminal is configured to continue synchronization with the selected access network when the initialization state protocol transition back to the Synchronization State.

15. The wireless access terminal of claim 1, wherein the modem controller protocol comprises:
an Inactive State;
an Initial Acquisition State, wherein the modem is configured to tune to a selected channel and search for a pilot signal while the modem controller protocol is in the Initial Acquisition State;
a Mini Acquisition State, wherein the modem is configured to search for pilot signals in an active set while the modem controller protocol is in the Mini Acquisition State, and wherein the modem controller protocol is configured to transition to the Active State when a pilot signal in the active set is found;
an Active State; and
at least one state associated with a freeze state process, wherein the wireless access terminal is configured to wait for a pilot acquisition command while the modem controller protocol is in the Inactive State, wherein the modem controller protocol is configured to transition from the Inactive State to the Initial Acquisition State when the pilot acquisition command is received,
wherein the modem controller protocol is configured to transition from the Initial Acquisition State to the Inactive State, when the modem is unable to locate the pilot signal,
wherein the modem controller protocol is configured to transition from the Initial Acquisition State to the Mini Acquisition State when the pilot is located.

16. The wireless access terminal of claim 15, wherein the freeze state process comprises an Initial Acquisition Freeze State, and wherein the modem controller protocol is configured to transition from the Initial Acquisition State to the Initial Acquisition Freeze State when the modem tunes away from the selected access network, wherein the wireless access terminal is configured to store all modem state variables and suspend modem processing while the modem controller protocol is in the Initial Acquisition Freeze State, wherein the modem controller protocol is configured to transition from the Initial Acquisition Freeze State to the Initial Acquisition State when the modem tunes back to the selected network, wherein the wireless access terminal is configured to restore all modem state variables and resume modem processing when the modem controller protocol transitions back to the Initial Acquisition State.

17. The wireless access terminal of claim 15, wherein the freeze state process comprises a Freeze State, and wherein the modem controller protocol is configured to transition from the Mini Acquisition State to the Freeze State when the modem tunes away from the selected access network, wherein the wireless access terminal is configured to store all modem state variables and suspend modem processing while the modem controller protocol is in the Freeze State, wherein the modem controller protocol is configured to transition from the Freeze State to the Mini Acquisition State when the modem tunes back to the selected network, wherein the wireless access terminal is configured to restore all modem state variables and resume modem processing when the modem controller protocol transitions back to the Mini Acquisition State.

18. A method for monitoring signals from at least two different access networks configured to use different communication technologies, the method comprising:
   communicating with a first communication technology associated with a selected one of the at least two different access networks;
   entering a specific state in response of turning to tuning away from the selected one of the at least two different access network networks to monitor a second one of the at least two different access networks using a second communication technology; and
   resuming communicating associated with the first communication technology without reinitializing in response to tuning back to the selected one of the at least two different access networks;
   executing at least one of the following protocols:
   an idle state protocol, configured to provide sleep/monitor state control for a wireless access terminal after it has acquired one of the at least two different access networks, before it has established a connection with the acquired one of the at least two different access networks;
   an initialization state protocol, configured to enable the wireless access terminal to acquire the one of the at least two different access networks; and
   a modem controller protocol, configured to enable the wireless access terminal to control a modem.

19. The method of claim 18, wherein the entering comprises:
   storing state information for the first communication technology in response of turning to the tuning away.

20. A wireless access terminal configured to monitor signals from at least two different access networks configured to use different communication technologies, the wireless access terminal comprising:
   a modem configured to transition between the different communication technologies to monitor signals from the at least two different access networks; and
   a protocol module configured to process commands associated with a first communication technology associated with a selected one of the at least two different access networks, the protocol module further configured to enter a specific state in response to the modem tuning away from the selected access network to monitor a second access network using a second communication technology and to resume processing commands associated with the first communication technology, without the need to reinitialize, in response to the modem tuning back to the selected access network, wherein the protocol module executes:
   an idle state protocol to provide sleep/monitor state control for the wireless access terminal after it has acquired one of the at least two different access networks, before it has established a connection with the acquired access network,
   wherein the wireless access terminal is configured to monitor a control channel established between the wireless access terminal and the acquired access network and to receive page messages over a page channel assigned to the wireless access terminal by the access network.

21. The wireless access terminal according to claim 20, wherein the protocol module is configured to execute:
   an initialization state protocol to enable the wireless access terminal to acquire the one of the at least two different access networks, and
   a modem controller protocol to enable the wireless access terminal to control the modem.

22. The wireless communication device of claim 20, wherein the idle state protocol comprises:
   an Inactive State;
   a Freeze Pending State; and
   a Monitor State;
   wherein the wireless access terminal is configured to wait for an activate command when the idle state protocol is in the Inactive State,
   wherein the idle state protocol is configured to transition from the Inactive State to the Monitor State when the activate command is received,
   wherein the idle protocol is configured to transition from the Inactive State to the Freeze Pending State when the modem tunes away while a traffic channel established between the wireless access terminal and the access network is active, and
   wherein the idle state protocol is configured to transition from the Freeze Pending State to the Inactive State when the modem tunes back to the acquired access network.

23. The wireless access terminal of claim 20, wherein the initialization state protocol comprises:
   an Inactive State;
   a Network Determination State, wherein the wireless access terminal is configured to select an access network while the initialization state protocol is in the Network Determination State;
   a Pilot Acquisition State, wherein the wireless access terminal is configured to attempt to acquire a pilot channel associated with the selected access network while the initialization state protocol is in the Pilot Acquisition State;
   a Synchronization State, wherein the wireless access terminal is configured to synchronize with the selected access network while the initialization state protocol is in the Synchronization State,
   wherein the wireless access terminal is configured to wait for an activate command when the initialization state protocol is in the Inactive State, wherein the initialization state protocol is configured to transition from the Inactive State to the Network Determination State when the activate command is received, wherein the initialization state protocol is configured to transition from the Network Determination State to the Pilot Acquisition State when the selected one of the at least two different access networks is selected.

24. The wireless access terminal of claim 20, wherein the modem controller protocol comprises:
   an Inactive State;
   an Initial Acquisition State, wherein the modem is configured to tune to a selected channel and search for a pilot signal while the modem controller protocol is in the Initial Acquisition State;
   a Mini Acquisition State, wherein the modem is configured to search for pilot signals in an active set while the modem controller protocol is in the Mini Acquisition State, and wherein the modem controller protocol is configured to transition to the Active State when a pilot signal in the active set is found;
   an Active State; and
   at least one state associated with a freeze state process, wherein the wireless access terminal is configured to wait for a pilot acquisition command while the modem controller protocol is in the Inactive State, wherein the modem controller protocol is configured to transition from the Inactive State to the Initial Acquisition State when the pilot acquisition command is received,
   wherein the modem controller protocol is configured to transition from the Initial Acquisition State to the Inactive State, when the modem is unable to locate the pilot signal,
   wherein the modem controller protocol is configured to transition from the Initial Acquisition State to the Mini Acquisition State when the pilot is located.

* * * * *